United States Patent
Gordon et al.

(10) Patent No.: US 7,317,830 B1
(45) Date of Patent: *Jan. 8, 2008

(54) BACKGROUND ESTIMATION AND SEGMENTATION BASED ON RANGE AND COLOR

(75) Inventors: Gaile Gordon, Palo Alto, CA (US);
Trevor Darrell, Boston, MA (US);
Michael Harville, Palo Alto, CA (US);
John Woodfill, San Francisco, CA (US)

(73) Assignee: Vulcan Patents LLC, Seattle, CA (US)

( * ) Notice: Subject to any disclaimer, the term of this patent is extended or adjusted under 35 U.S.C. 154(b) by 836 days.

This patent is subject to a terminal disclaimer.

(21) Appl. No.: 10/703,393

(22) Filed: Nov. 7, 2003

Related U.S. Application Data

(63) Continuation of application No. 09/453,450, filed on Dec. 3, 1999, now Pat. No. 6,661,918.

(60) Provisional application No. 60/110,919, filed on Dec. 4, 1998.

(51) Int. Cl.
*G06K 9/34* (2006.01)

(52) U.S. Cl. .................................................. 382/173

(58) Field of Classification Search ............... 382/173, 382/162–167, 106, 103, 168, 171, 118, 154; 348/14.01–14.15, 42–60; 345/589, 593; 356/602
See application file for complete search history.

(56) References Cited

U.S. PATENT DOCUMENTS

| | | | |
|---|---|---|---|
| 5,864,630 A | 1/1999 | Cosatto et al. | 382/103 |
| 5,917,937 A | 6/1999 | Szeliski et al. | 382/154 |
| 6,028,672 A | 2/2000 | Geng | 356/602 |
| 6,141,434 A | 10/2000 | Christian et al. | 382/103 |
| 6,188,777 B1 | 2/2001 | Darrell et al. | 382/103 |
| 6,661,918 B1 * | 12/2003 | Gordon et al. | 382/173 |
| 6,807,290 B2 * | 10/2004 | Liu et al. | 382/118 |

OTHER PUBLICATIONS

Appenzeller, et al, "A Low-Cost Real-Time Stereo Vision System for Looking at People", Proc. Of IEEE International Symposium on Industrial Electronics, 1997, vol. 3, p. 767-722.

(Continued)

*Primary Examiner*—Ishrat Sherali
(74) *Attorney, Agent, or Firm*—Perkins Coie LLP

(57) ABSTRACT

Segmentation of background and foreground objects in an image is based upon the joint use of range and color data. Range-based data is largely independent of color image data, and hence not adversely affected by the limitations associated with color-based segmentation, such as shadows and similarly colored objects. Furthermore, color segmentation is complementary to range measurement in those cases where reliable range data cannot be obtained. These complementary sets of data are used to provide a multidimensional background estimation. The segmentation of a foreground object in a given frame of an image sequence is carried out by comparing the image frames with background statistics relating to range and normalized color, using the sets of statistics in a complementary manner. A background model is determined by estimating using a multidimensional histogram, recording pixel values, configuring the pixel values into a cluster, and selecting a largest cluster as representing the background model.

28 Claims, 3 Drawing Sheets

OTHER PUBLICATIONS

Gordon, et al, "Background Estimation and Removal Based on Range and Color", Interval Research Corporation, 1999.

Kim, Sang-Hoon et al, "Facial Region Detection Using Range Color Information"; IEICE Transactions on Information and Systems, JP, Institute of Electronics Information and Comm. Eng. Tokyo, vol. E81-D, No. 9, Sep. 1998, pp. 968-975.

Malassiotis, Stiris et al, "Coding of video-conference stereo image sequences using 3D models"; Signal Processing Image Communication, NL, Elsevier Science Publishers, Amsterdam, vol. 9, No. 2, Jan. 1997, pp. 125-135.

Nickerson, S.B., et al, "The ARK project: Autonomous Mobile Robots for Known Industrial Environments"; Robotics and Autonomous Systems, NL, Elsevier Science Publishers, Amsterdam, vol. 25, No. 1-2, Oct. 1998, pp. 83-104.

Taniguchi, et al, "Scene Interpretation by Fusing Intermediate Results of Multiple Visual Sensory Information Processing", Proc. IEEE International Conference on MFI 1994, Multi-sensor Fusion and Integration for Intelligence Systems, pp. 699-706.

Woodfill, John, "Real-Time Stereo Vision on the PARTS Reconfigurable Computer", IEEE Symposium on FPGAs for Custom Computing Machines, Apr. 1997.

* cited by examiner

BACKGROUND ESTIMATION AND SEGMENTATION BASED ON RANGE AND COLOR

This application is a continuation of U.S. patent application Ser. No. 09/453,450 now U.S. Pat. No. 6,661,918, entitled "Background Estimation and Segmentation Based on Range and Color" filed Dec. 3, 1999, which claims priority from U.S. Provisional Patent Application No. 60/110,919, entitled "Background Estimation and Removal Based on Range and Color" filed Dec. 4, 1998, which is incorporated herein by reference for all purposes.

FIELD OF THE INVENTION

The present invention is generally directed to the field of computer vision, and more particularly to a technique for automatically distinguishing between a background scene and foreground objects in an image.

BACKGROUND OF THE INVENTION

The ability to automatically distinguish between a background scene and foreground objects in an image, and to segment them from one another, has a variety of applications within the field of computer vision. For instance, accurate and efficient background removal is important for interactive games, the detection and tracking of people, and graphical special effects. In the context of the present invention, the "background" portion of a scene is considered to be those elements which remain relatively static over a period of time, whereas the "foreground" objects are more dynamic. A typical example of a scene in which it may be desirable to discriminate between foreground and background is a video sequence of people moving about a room. The people themselves are considered to be the foreground elements, whereas the stationary objects in the room constitute the background, even though they may be located closer to the video camera than the people.

The determination whether a region in a scene corresponds to the background or to foreground objects is basically carried out by comparing a series of related images, such as successive frames in a video sequence, to one another. This determination is typically performed for each individual pixel of an image. In the past, two different techniques have been employed to automatically distinguish between the background and foreground portions of an image. One such technique is based upon the color or grayscale intensity of the elements in the scene. In this approach, the color or grayscale value of each pixel in a sequence of images is stored. If the color of a given pixel is relatively constant over a significant portion of the images in a sequence, that pixel is considered to represent a background element. Thereafter, if the color of the pixel changes from the stored background color, a foreground object is considered to be present at the pixel. Examples of this technique are described in Grimson et al, "Using Adaptive Teaching to Classify and Monitor Activities in a Site," *Proceedings of the IEEE Computer Society Conference on Computer Vision and Pattern Recognition*, Santa Barbara, Calif., June 1998; Haritaoglu et al, "W4: Real-time System for Detecting and Tracking People," *Proceedings of International Conference on Face and Gesture Recognition*; Nara, Japan, April 1998; and Wren et al, "Pfinder: Real-time Tracking of the Human Body," *IEEE Trans on Pattern Analysis and Machine Intelligence*, 19:7, July 1997.

There are two significant limitations associated with this segmentation approach. First, if regions of the foreground contain colors which are similar to those of the background, they will not be properly identified as portions of a foreground object. Secondly, shadows that are cast by foreground objects will cause a change in the color value of the background objects within the region of the shadow. If this change in the color value is sufficient, the background pixels within the region of the shadow will be erroneously identified as portions of the foreground. This latter problem can be somewhat minimized by computing differences in color space, e.g. hue, log color component, or luminance-normalized color value, to decrease the sensitivity to changes in luminance or brightness. However, it is difficult to select a threshold value for the required difference between a background color and a foreground color that would allow most shadow pixels to match their normal background color, but still discriminates foreground regions which may have a similar hue as the background pixels.

The other major approach that has been employed to distinguish between the foreground and background portions of a scene is based upon the range of the individual elements within the scene, i.e. their respective distances from the camera. Examples of this technique are described in C. Eveland et al., "Background Modeling or Segmentation of the Video-Rate Stereo Sequences", *Proceedings of the IEEE Computer Society Conference on Computer Vision and Pattern Recognition*, Santa Barbara, Calif., June 1998; Kanade et al., "A Video-Rate Stereo Machine and Its New Applications", *Computer Vision and Pattern Recognition Conference*, San Francisco, Calif., 1996; and Ivanov et al., "Fast Lighting Independent Background Subtraction", *Proceedings of IEEE Workshop on Visual Surveillance*, Bombay, India, January 1998. In one implementation of this approach, depth thresholding is applied. The distance to each object within the scene is determined, using any suitable technique. Objects whose distances are greater than a threshold value are considered to be in the background, whereas those which are closer are labeled as foreground objects. This threshold-based approach has certain limitations. It can only be used in very simple scenes in which the background objects are always further away from the camera than foreground objects. A more common approach to the use of range in foreground segmentation of a scene is to label as foreground any pixel at which there is a relatively large difference between its current range value and a stored background range value. The background value is determined at each pixel based on the furthest, commonly seen value.

Stereo imaging has been employed to compute the range at each pixel in the above-referenced examples. Stereo imaging techniques for determining range rely upon the ability to identify corresponding pixels in each of two images that are respectively captured by the two cameras of a stereo pair. To identify corresponding pairs of pixels in the two images, sufficient contrast must be present in order to distinguish different pixels from one another. This technique therefore does not perform well in regions of the image which have uniform intensity values. Furthermore, since the two cameras of the stereo pair are spaced from one another, a background region may be occluded from the view of one of the cameras by a foreground object. Correspondence between pixels and therefore range in the images from the two cameras cannot be established in these regions. As a result, it is rare that all pixels in a scene will have reliable range data upon which a foreground/background segmentation decision can be based. However, a particular advantage associated with the use of segmentation based on stereo range is that a sudden change in illumination will not produce a change in range, whereas it could produce changes in color intensity.

In the approach described by Eveland et al, if a range value at a given pixel is very often unknown, and a new image provides a known valid range value at that pixel, it is considered to be a foreground pixel in that image. It will be appreciated that this technique can lead to erroneous results, because it is based on uncertain data. The system described by Ivanov et al pre-computes and stores a disparity map for each pixel of an image. In a pair of new images, if the intensity at previously corresponding pixels is not the same, it is labeled as a foreground pixel. Because of its reliance on a pre-computed map, this technique is not able to adapt to changes in the background scene.

It is an objective of the present invention, therefore, to provide a technique for distinguishing between foreground and background elements of an image that provides improved results relative to the color-based and range-based techniques that have been employed in the past.

SUMMARY OF THE INVENTION

In accordance with the present invention, background estimation is based upon a multi-dimensional model that uses both range and color data. Range-based data is largely independent of color image data, and hence not adversely affected by the limitations associated with color-based segmentation, such as shadows and similarly colored objects. Furthermore, color segmentation is complementary to range measurement in those cases where reliable range data cannot be obtained. These complementary sets of data are used to provide a multidimensional background estimation. The segmentation of a foreground object in a given frame of an image sequence is carried out by comparing the image frames with background statistics relating to range and normalized color. By using the sets of statistics in a complementary manner, more reliable identification of foreground objects can be obtained.

A detailed discussion of the features of the present invention, together with the advantages offered thereby, is set forth hereinafter with reference to illustrative examples depicted in the accompanying drawings.

DETAILED DESCRIPTION

Figure 1A:
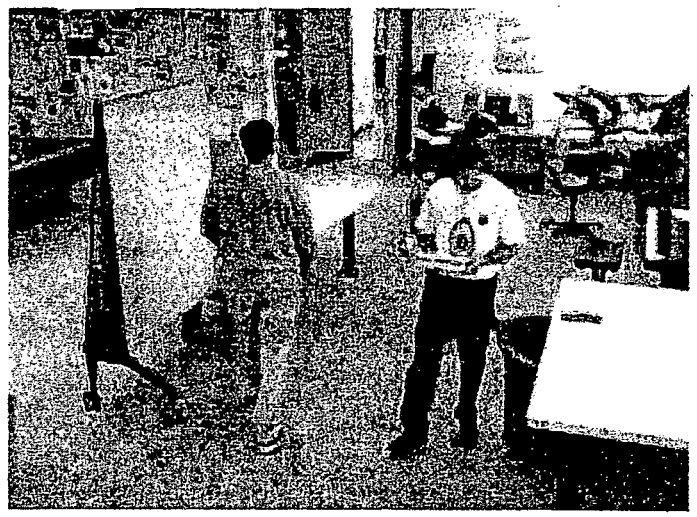
FIGS. 1a-1c illustrate an exemplary sequence of video images.
Figure 1B:
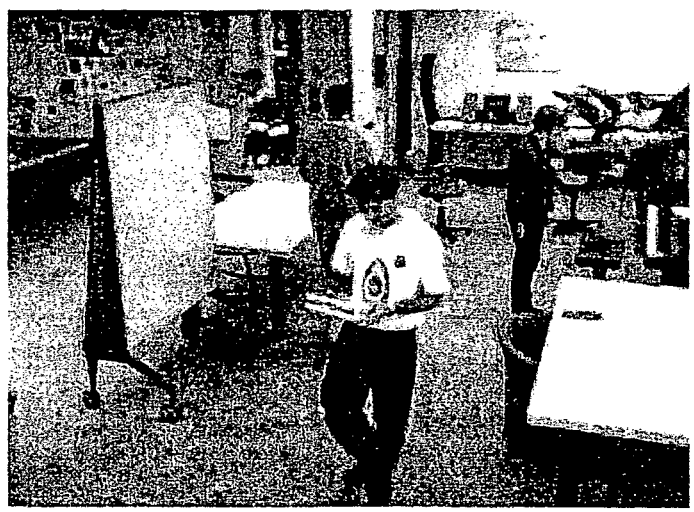
Figure 1C:
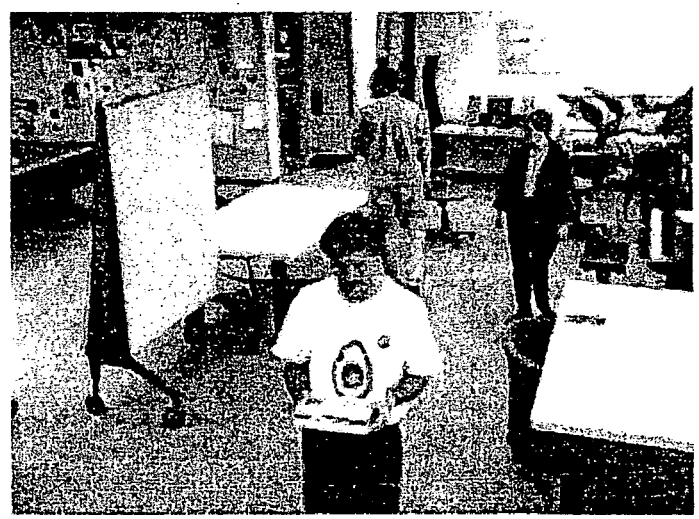

The ability to distinguish between dynamic foreground objects in a scene and the static background regions of the scene has a number of useful applications. One such application is the detection of people within an area. FIGS. 1a-1c are a sequence of related images which depict individuals moving within a room having stationary objects, such as tables and other pieces of furniture. The items of furniture and the walls represent elements of a background scene, while the people constitute foreground objects whose position and movements are to be detected. Even though one of the tables is foremost in the scene, it is considered to be a background object, since it is a stationary object within the scene.

Figure 2:
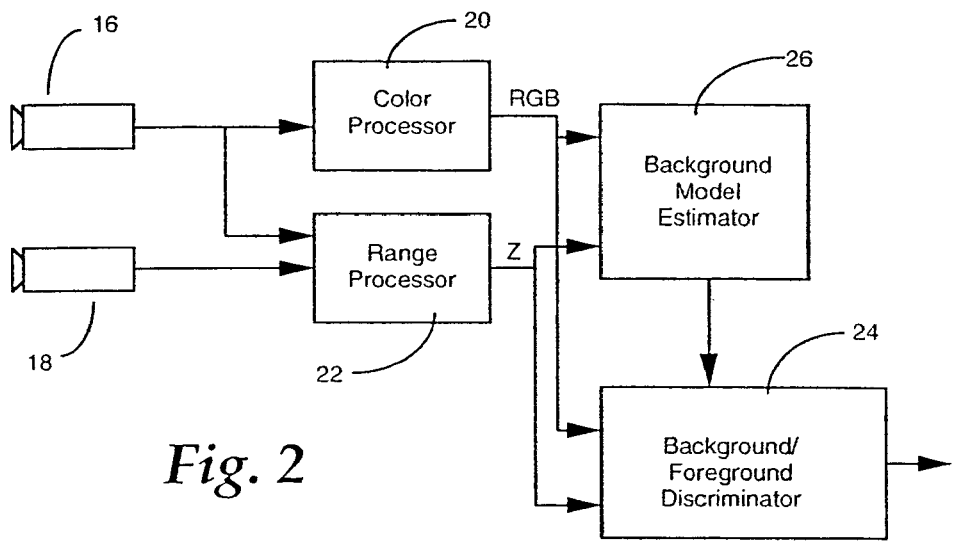
FIG. 2 is a block diagram of a system for distinguishing between background and foreground objects in an image.

A system for distinguishing between the foreground objects and the background elements in each image of the sequence is illustrated in the block diagram of FIG. 2. Images of the scene are captured in electronic form by a pair of digital video cameras 16, 18 which are displaced from one another to provide a stereo view of the scene. These cameras generate two types of data for each pixel of each image in the video sequence. One type of data comprises the intensity value of the pixel. In the context of the present invention, the term "intensity" is employed to identify an appearance attribute of a pixel. the intensity value could be one-dimensional, e.g. luminance or a grayscale magnitude. alternatively, it could be two-dimensional, such as a UV chrominance value, or a three-dimensional color space, e.g. RGB, YUV, HSL, etc. In the discussion which follows, RGB color data will be employed as an exemplary intensity representation. In one embodiment, one of the two cameras, e.g. camera 16, can be selected as a reference camera, and the RGB values from this camera are supplied to a color processor 20 as the color data for each image in a sequence of video images.

The other type of data comprises a distance value Z for each pixel in the scene. This distance value is computed in a range processor 22 by determining the correspondence between pixels in the images from each of the two cameras 16, 18. The distance between locations of corresponding pixels is called disparity. Generally speaking, disparity is inversely proportional to the distance of the object represented by that pixel. In a preferred embodiment of the invention, the census stereo algorithm is employed to determine a disparity value for each pixel in the image. A detailed discussion of this algorithm can be found in the publication "Non-Parametric Local Transforms for Computing Visual Correspondence", by R. Zabih and J. Woodfill, appearing in *Proceedings of the Third European Conference on Computer Vision*, Stockholm, May 1994. A stereo camera system which can be used in the context of the present invention to determine the distance data in real time is described in "Real-Time Stereo Vision on the PARTS Reconfigurable Computer", by J. Woodfill and B. Von Herzen, appearing in *IEEE Symposium on Field-Programmable Custom Computing Machines*, Napa, April 1997. The disclosures of both of these publications are incorporated herein by reference thereto.

The information that is produced from the camera images comprises a multidimensional data value (R, G, B, Z) for each pixel in each frame of the video sequence. This data is provided to an estimator 26, which computes a background model for each pixel within the image. In some applications, it is possible to obtain introductory frames in a video sequence which contain only background elements. For instance, it may be possible to obtain images of an empty room before people enter it. If these images are available, the background color and depth values can be computed directly. Once a background model has been determined, the value of the pixel in a given frame i is compared to the background model in a discriminator 24, to determine whether the pixel represents a foreground or a background object. If the data value for a pixel in the given frame is close to that of the same pixel in the background model, the pixel is considered to represent a background region. If, however, the differences in their respective data values exceed a threshold criterion, the pixel is labeled a foreground pixel for that frame.

Figure 3:
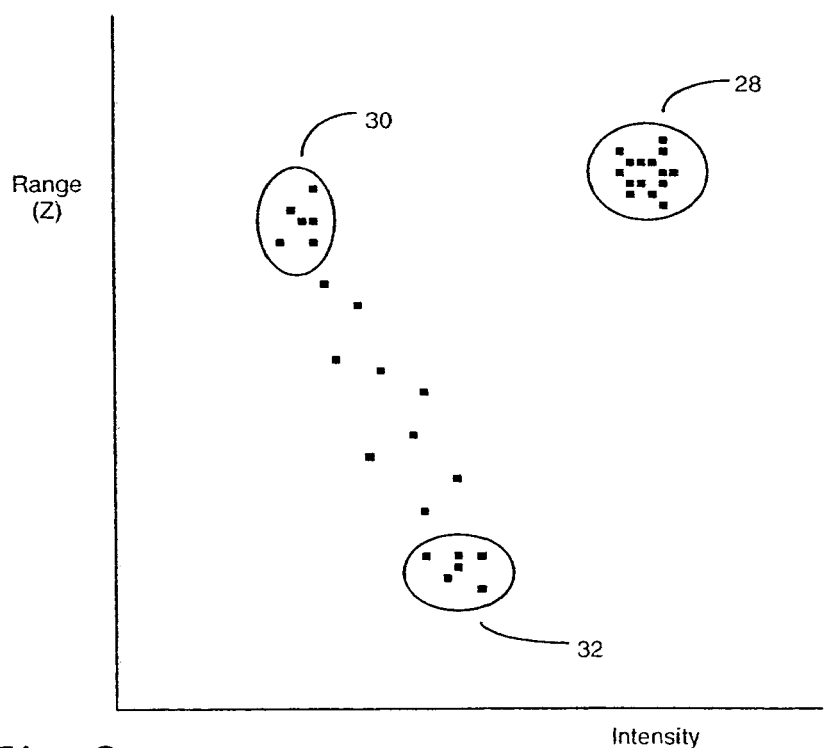
FIG. 3 is an example of a histogram for one pixel.

To compute the background model, the pixel data values from a sequence of images are recorded in a multidimensional histogram within the estimator 26. An example of such a histogram for one pixel is illustrated in FIG. 3. For ease of illustration, a two-dimensional histogram is represented, wherein the distance value Z represents one dimension and the intensity value is depicted as a second dimension. In practice, however, the intensity of each of the components of the selected color space (e.g. RGB, UV, HSL or 2-dimensional subspaces that are invariant to overall luminance changes) are individually represented as separate dimensions. Each data point within the histogram corresponds to the (R, G, B, Z) data value at a given pixel over a respective sequence of frames. The data values are then clustered into groups, using any suitable data clustering method. As can be seen, a number of the data values are clustered within a relatively small area 28. The data values for the pixel in other frames of the sequence can be clustered in other, smaller groups 30, 32.

One of the clusters is selected as the background model for that pixel. The background cluster is selected as the one having the deepest range value which covers the data over a suitable period of the time represented by the sequence of frames. For example, if the cluster of deepest range values persists for at least 10% of the frames, it can be selected as the background model.

In some cases, a depth value may be undefined at a given pixel in a large portion of the frames. In these types of situations, the depth value of a pixel would not be reliable for identifying the background cluster. In these cases, therefore, the data can be clustered in the color dimensions, and the largest cluster, i.e. the cluster containing the most data points, is designated as the background color.

By means of this clustering technique, background values can even be estimated in the presence of foreground elements, as long as there is sufficient data representing the background at any given pixel over the sequence of images. In conventional background estimation techniques which are based only upon color, the background color is selected from a color histogram at each pixel. In this technique, the background must be present at a given pixel in the majority of the frames for correct background estimation. However, when both color and depth information are used in the background estimation process, as in the present invention, for any pixel in which the depth value is reliable, an estimate for both depth and color of the background can be obtained, even when the background is represented in only a minority of the frames.

In one embodiment of the invention, once the background model has been determined for a scene, it can remain static. In some cases, however, it may be desirable to dynamically vary the background model, to accommodate changes that occur over time. For example, if background objects are repositioned within a room, it is preferable to recognize the new positions of the objects as elements of the background, rather than identify them as a foreground objects. To accommodate such a situation, the calculation of the background model can be continuously updated from the most recent N frames of the image, rather than be based on all frames or only the earliest frames. As an alternative to storing all of the pixel data for a large number of frames, a model comprising a description of a suitable number of the best clusters in the histogram can be stored. The most recent image can be used to update this background model, for example by means of an impulse response filter or the like.

Further in this regard, the level of activity in a scene can be used to control the learning rate for estimating the background. The activity level can be determined from the frame-to-frame changes in the range and color data for a pixel. If the frame-to-frame changes are relatively great for a pixel, this corresponds to a high level of activity. In such a case, the learning rate is decreased, e.g. the weighting of the most current frame is decreased in the update filter so the value of N is effectively increased. However, if the activity level is low, the learning rate can be increased, to thereby accommodate changes in the background more readily.

In another situation, a portion of the background may be constantly changing. For instance, if a television is present in a room being monitored, the varying display could be improperly interpreted as a foreground element. In this case, it may be desirable to raise the color threshold to a very high value, or to simply exclude color-based criteria from the area corresponding to the screen of the television, and use range as the sole indicator of foreground objects in this area of the image.

Once an estimate of the background is obtained in terms of color and range, this data can be provided to the discriminator 24 to segment foreground pixels from background pixels in subsequent images of the same scene. In general, a pixel is identified as being part of the foreground, F, when its value in the current frame is significantly different from the background model. For instance, if the background model for a pixel is represented as a Gaussian distribution, this difference can be determined relative to the standard deviation, as follows:

$$F \equiv |P_i - P_m| > k\sigma$$

where $P_i$ is the pixel value in frame i (in both color and range space), $P_m$ is the mean of the background model for the same pixel, $\sigma$ is the variance of the model at that pixel, and k is a threshold parameter. More generally, any suitable form of distance metric and threshold can be employed to determine whether a given pixel's difference from the background data value for that pixel is sufficient to identify it as a foreground pixel.

In a practical implementation of this approach, it may be necessary to take into account low confidence values for either the range or color data, as well as the effects of shadows and other luminance variations. In a preferred embodiment, low confidence values are treated differently for the range and color comparisons. In this embodiment, conservative foreground criteria, $F_r$ and $F_c$, are defined for range and color, respectively, for each pixel. The final determination, whether a given pixel represents a foreground object, comprises a disjunction of the two criteria.

Various factors can affect the reliability of the range data that is obtained. For instance, the determination of corresponding pixels in each of the two images relies upon contrast in the image. If there is no contrast in the image, i.e. all of the pixels have the same intensity value, it is not possible to identify individual pixels that correspond to one another in the two images. However, when the image contains a significant amount of contrast, where neighboring pixels have appreciably different intensity values, the ability to identify individual corresponding pixels is greatly enhanced. Hence, the amount of contrast in an image, e.g. the frequency of change of color values within a scan line, can be employed as an indicator of the reliability of the range data.

Another significant factor in the reliability of range data is the presence of occlusions. Due to their spacing, one of the two cameras 16 and 18 may be able to view a portion of the background behind a foreground object, whereas the other camera is blocked from that view by the foreground object. In this case, correspondence cannot be established between the two camera views for certain pixels, and the reliability of the range data for the occluded pixels is low.

Other factors can affect the range determination as well. Each of the various factors which can affect the reliability of the range data are used to compute a confidence value. This confidence value is then compared against a threshold to provide an indication whether the range data is valid or invalid. In a conservative approach, range data for a given pixel is not employed in the segmentation determination unless the range values in both the current frame i and in the background model, $r_i$ and $r_m$, respectively, are valid. In such a case, their differences are evaluated to determine whether the pixel is a foreground pixel. For instance, if the absolute value of the difference between $r_i$ and $r_m$ is greater than a threshold, $|r_i - r_m| > k\sigma$, then $F_r$=true. Any other suitable metric for measuring the differences in the range values can be employed as well.

In a more preferred embodiment, foreground decisions can be made when $r_m$ is invalid, if $r_i$ is valid and smoothly connected to regions where foreground determinations have been made in the presence of valid background data. In one approach, the local gradient of $r_i$ can be compared against a threshold value G which represents discontinuities in range. This threshold value might be set on the basis of the expected smoothness of foreground objects. If the gradient of $r_i$ is less than G, then $F_r$=true for that pixel when $F_r$=true for its neighboring pixels. A similar gradient-based approach can be employed for the color criterion $F_c$ as well.

In the context of color-based comparisons, shadows of foreground elements can cause appearance changes in the background. If these appearance changes are significant, they can cause background pixels to be identified as part of the foreground, which is not desirable. Several measures can be employed to minimize the impact of shadows. As one measure, a luminance-normalized color space, $$\left( \frac{R_i}{Y_i}, \frac{G_i}{Y_i}, \frac{B_i}{Y_i} \right),$$

is generated by the color processor 20, where $Y_i$ represents the luminance value for the pixel, to reduce the differences in the color value of a background object under lighting changes induced by shadows or interreflections. This normalized color representation becomes unstable when the luminance value is close to zero. Therefore, a valid luminance value is defined as $YValid(Y) \equiv Y > Y_{min}$.

The distance between a pixel's current color value and the background model value in this normalized color space is identified as $\Delta color$. The primary criterion for foreground segmentation is $\Delta color$, which essentially corresponds to a hue difference in the context of valid luminance. If $\Delta color$ is greater than a threshold value, the pixel is considered to represent a foreground region of the image. As in the case of the range data, the threshold value can be determined relative to the standard deviation, e.g. $c\sigma$ where c is a color threshold parameter, when the data is expressed as a Gaussian distribution. This threshold comparison can be augmented with a luminance ratio criterion, and a final luminance comparison in the context of invalid model luminance. This composite criterion can be expressed as follows:

$$F_c \equiv (YValid(Y_m) \wedge YValid(Y_i) \wedge (\Delta color > c\sigma)) \vee$$
$$\left( YValid(Y_m) \wedge \left( \left( \frac{Y_i}{Y_m} < \text{shad} \right) \vee \left( \frac{Y_i}{Y_m} > \text{reflect} \right) \right) \right)$$
$$\vee (\neg YValid(Y_m) \wedge (Y_i > \alpha Y_{min})).$$

The first line of this expression relates to the primary criterion that is based on $\Delta color$, when valid luminance data is present. The second line takes into account changes due to shadows and reflections, where at least valid background luminance is present. The parameters shad and reflect are luminance ratio limits for shadows and reflections. Ideally, the luminance ratio $$\frac{Y_i}{Y_m}$$

is approximately one for background pixels. A shadowed background value is usually darker than the model background. Interreflections can lighten the background but this effect is usually not as strong as the darkening due to shadows. Therefore, separate luminance ratio limits are employed for shadows and reflections. If the luminance ratio is less than the shadow limit or greater than the reflection limit, the pixel is considered to represent a foreground region.

The last clause in the criterion permits a segmentation determination to be made even when the model has very low luminance, if the pixel's luminance value is substantially higher than $Y_{min}$. For example, a value of $\alpha = 2$ can be employed for this criterion.

Although the impact of shadows is minimized by using a luminance-normalized color space, the color threshold value, e.g $c\sigma$, must still be set so that it is tolerant of remaining artifacts from strong shadows while maintaining the integrity of true foreground regions. The tradeoffs between these considerations is alleviated in a further aspect of the invention by using the range information to dynamically adjust the color matching criterion for individual pixels. In practice, whenever the range data indicates that a pixel belongs to the background, the color threshold $c\sigma$ is increased. In other words, the difference between the background model and the color value of the current frame's pixel can be greater, before the pixel is designated as a foreground pixel. This permits shadows in areas which appear to be at background depth to be ignored, while maintaining the restrictiveness of the color matching criterion within regions at which depth is uncertain. However, if the range value indicates that a pixel is in the foreground, the color matching criterion can be ignored, since the range information alone is sufficient for correct segmentation in this case.

Figure 4A:
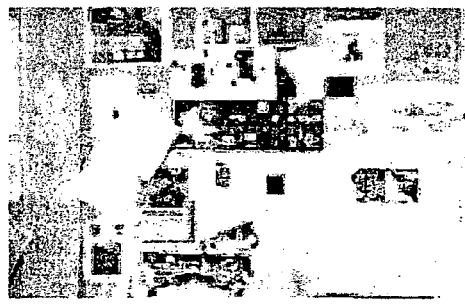
FIGS. 4a-4e illustrate the results of processing an image using range-based adjustment of the color matching criterion.
Figure 4B:
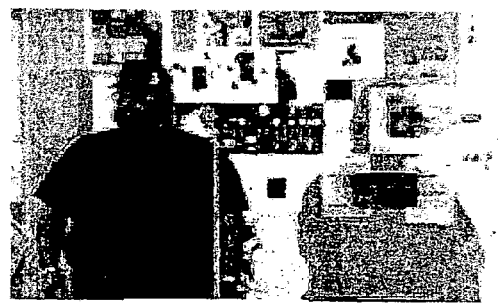
Figure 4C:
Figure 4D:
Figure 4E:

FIG. 4a illustrates an example of a background image which comprises a wall with a variety of items hung on it. FIG. 4b is another image of the same scene with a foreground object, namely a person. As can be seen, the person casts a strong shadow on the wall. FIG. 4c shows a combined range and color-based segmentation in which the color threshold is not adapted according to depth information. In this case, the shadow on the wall is sufficiently dark that it exceeds the color threshold setting, and causes the area of the shadow to be labeled as part of the foreground, even though the depth information indicates that it is background. If the color threshold is simply increased for the entire image, in order to remove the shadow, valid portions of the foreground are eroded, as can be seen in portion's of the person's face and arm in FIG. 4d. Even then, the darkest part of the shadow area is still identified as a foreground region. However, by adaptively increasing the color threshold for those pixels where the depth data matches the background model, the shadow can be eliminated, without impacting the remainder of the foreground, as depicted in FIG. 4e.

To produce the final segmentation, the disjunction of the range and color criteria is employed, as follows:

$$F \equiv F_r \vee F_c$$

A pixel identified as foreground, based on either the depth or the color criterion, is taken to be a foreground pixel in the combined segmentation.

The resulting segmentation may contain small isolated foreground points that are due to noise in the color or range processing. There may also be some remaining small holes in the foreground region. The foreground holes can be filled by means of a morphological closing technique. One example of such a technique is described in Vincent, L., "Morphological Grayscale Reconstruction in Image Analysis Applications in Efficient Algorithms," *IEEE Transactions on Image Processing*, 2:2, pp. 176-201, April 1993. The final foreground segmentation result is then obtained by taking connected components larger than a certain minimum area. The minimum area criteria can be conservative, to eliminate only noise-related foreground elements, or it can be set at higher values based on expected absolute size, to thereby capture only foreground elements of interest, e.g. to select people but not pets.

By using a multi-dimensional representation for each pixel in accordance with the present invention, significant advantages can be obtained. In particular, when the background value for a pixel is based only upon distance or color, the background information can be easily contaminated with foreground data. For instance, in a scene where people are walking across a floor, their shoes, which represent foreground objects, come into close proximity with the floor, which is a background object. If distance data is used to estimate the background, the data representing the distance to the floor is biased to a certain extent by the shoe data when they are clustered in a distance histogram. In another example, a person wearing a greenish-blue shirt, which comprises a foreground object, may walk in front of a blue wall, which is a background object. If color is used to distinguish between the foreground and background objects, the blue background color will be biased towards green in the color histogram. In these two examples, however, if the shoe is a significantly different color from the floor, and the person is located at a different distance from the camera than the wall, the combined distance and color histograms for the foreground and background data values will not overlap. As a result, more accurate estimates of the background can be obtained in both cases.

From the foregoing, therefore, it can be seen that the present invention provides a technique for distinguishing between foreground and background portions of a scene, through the use of multi-dimensional data based on range and color. The use of color and range together overcomes many of the limitations associated with conventional segmentation in which each type of data is treated separately, including problems such as points with similar color in both the background and foreground, shadows, points with invalid data in the background or foreground range, and points with similar range values for both background and foreground. The higher dimensional histograms that are provided by the present invention allow for better separation of background and foreground statistics, resulting in a cleaner estimate at each pixel. In cases where the range data is largely valid, each point in the background need only be visible in a relatively few frames to provide for an accurate background estimate. Even in those situations where a background-only image is not available, i.e. the scenes always contain some foreground elements, such as the example of FIG. 1, the present invention provides a useful tool for modeling the background.

It will be appreciated by those of ordinary skill in the art that the present invention can be embodied in other specific forms without departing from the spirit or essential characteristics thereof. The presently disclosed examples are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method for distinguishing between background and foreground objects in an image, comprising the steps of:
   i) determining respective range values for pixels in each of a plurality of related images;
   ii) determining respective intensity values for pixels in each of said plurality of related images;
   iii) establishing a multi-dimensional background model for at least some of said pixels on the basis of said range values and said intensity values;
   iv) comparing the range value for a particular pixel in a given image with the background model for that pixel, and labeling the pixel as a foreground pixel if the range value differs from the background model by a range threshold; and
   v) comparing the intensity value for said particular pixel in a given image with the background model for that pixel, and labeling the pixel as a foreground pixel if the intensity value differs from the background model by an intensity threshold.

2. The method of claim 1 further including the step of determining whether the range value for said particular pixel is valid, and performing said comparing step (iv) only if said range value is valid.

3. The method of claim 2 wherein determining whether the range value for said particular pixel is valid further includes:
   computing a confidence value; and
   comparing said confidence value to a threshold to determine if the range value for said particular pixel is valid.

4. The method of claim 2 further including the step of determining whether background range data for said particular pixel is valid, and if said background range data is not valid, labeling the particular pixel as a foreground pixel in response to the comparing step (iv) for neighboring pixels if a range gradient associated with said particular pixel is less than a gradient threshold.

5. The method of claim 1 further including the step of determining whether the luminance of said particular pixel is greater than a designated minimum value, and performing said comparing step (v) only if the luminance is greater than said minimum value.

6. The method of claim 1 further including the step of determining the ratio of the intensity value for said particular pixel to the background intensity value for that pixel, and labeling the pixel as a foreground pixel if said ratio is less than a first predetermined value.

7. The method of claim 6 wherein said first predetermined value is based upon a decrease in luminance due to shadows in an image.

8. The method of claim 6 further including the step of labeling the pixel as a foreground pixel if said ratio is greater than a second predetermined value.

9. The method of claim 8 wherein said second predetermined value is based upon an increase in luminance due to interreflections in an image.

10. The method of claim 1 further including the step of alternatively labeling the pixel as a foreground pixel if the luminance of the pixel is greater than a designated minimum value by a predetermined factor.

11. The method of claim 10 wherein said factor is at least 2.

12. The method of claim 10 wherein said alternative labeling step is performed only if the luminance of the background texture model for the pixel is less than said designated minimum value.

13. The method of claim 1 further including the step of updating said background model on the basis of range values and intensity values obtained from a sequence of N images.

14. The method of claim 13 further including the steps of detecting image-to-image changes in said range values and intensity values, and effectively adjusting the value of N in accordance with the detected changes.

15. The method of claim 14 wherein the value of N is effectively increased when the magnitude of detected changes increases.

16. The method of claim 1 wherein said intensity values are one-dimensional values corresponding to the luminance of pixels.

17. The method of claim 1 wherein said intensity values are two-dimensional values which are invariant to luminance.

18. The method of claim 1 wherein said intensity values represent a three-dimensional color space.

19. The method of claim 18 further including the step of normalizing said intensity values according to luminance.

20. A system for identifying foreground objects in an image comprising:
   a sensor which determines intensity values for pixels within an image;
   a range processor which determines distance values for pixels within said image;
   a background estimator which computes a multi-dimensional background model for said pixels on the basis of said intensity values and said distance values; and
   a discriminator which compares intensity and distance values for pixels in an image to said background model and determines whether said pixels represent a foreground object.

21. The system of claim 20 wherein said background estimator generates a multi-dimensional histogram of intensity and distance values for a pixel within a plurality of related images, and computes a background model for said pixel by means of a clustering technique.

22. The system of claim 20 wherein said discriminator determines the differences between the intensity and distance values for a pixel in an image and the background model for that pixel, and compares said differences to respective intensity and distance thresholds.

23. The system of claim 22 wherein said discriminator selectively adjusts said intensity threshold in accordance with the result of a comparison based upon said distance threshold.

24. The system of claim 22 wherein said discriminator increases said intensity threshold if the difference between the distance value for a pixel in an image and the background model for that pixel is less than said distance threshold.

25. The system of claim 20 wherein said intensity values are one-dimensional values corresponding to the luminance of pixels.

26. The system of claim 20 wherein said intensity values are two-dimensional values which are invariant to luminance.

27. The system of claim 20 wherein said intensity values represent a three-dimensional color space.

28. The system of claim 20 further including an intensity processor which normalizes said intensity values according to luminance.

* * * * *

UNITED STATES PATENT AND TRADEMARK OFFICE
CERTIFICATE OF CORRECTION

PATENT NO.         : 7,317,830 B1
APPLICATION NO.    : 10/703393
DATED              : January 8, 2008
INVENTOR(S)        : Gordon et al.

It is certified that error appears in the above-identified patent and that said Letters Patent is hereby corrected as shown below:

On the title page, in field (75), under "Inventors", in column 1, line 4, delete "San Francisco" and insert -- Palo Alto --, therefor.

On the title page, in field (73), under "Assignee", in column 1, line 1, delete "CA" and insert -- WA --, therefor.

On the face page, in field (56), under "Other Publications", in column 2, line 3, delete "722" and insert -- 772 --, therefor.

In column 1, line 66, delete "Trans" and insert -- Trans. --, therefor.

In column 4, line 16, after "pixel." delete "the" and insert -- The --, therefor.

In column 4, lines 17-18, after "magnitude." delete "alternatively" and insert -- Alternatively --, therefor.

In column 7, line 21, delete "$|r_i-r_m>k\sigma,$" and insert -- $|r_i-r_m|>k\sigma,$ --, therefor.

In column 8, line 42, delete "e.g" and insert -- e.g. --, therefor.

In column 9, lines 31-32, delete "Analysis" and insert -- Analysis: --, therefor.

Signed and Sealed this

First Day of July, 2008

JON W. DUDAS
*Director of the United States Patent and Trademark Office*